(12) United States Patent
Gizara et al.

(10) Patent No.: US 7,698,024 B2
(45) Date of Patent: Apr. 13, 2010

(54) SUPERVISORY CONTROL AND DATA ACQUISITION SYSTEM FOR ENERGY EXTRACTING VESSEL NAVIGATION

(75) Inventors: Andrew Roman Gizara, Lake Forest, CA (US); Michael Dominic Cicali, Galloway, NJ (US)

(73) Assignee: Integrated Power Technology Corporation, Lake Forest, CA (US)

(*) Notice: Subject to any disclaimer, the term of this patent is extended or adjusted under 35 U.S.C. 154(b) by 197 days.

(21) Appl. No.: 11/942,576

(22) Filed: Nov. 19, 2007

(65) Prior Publication Data

US 2009/0132101 A1    May 21, 2009

(51) Int. Cl.
*G05D 1/10*    (2006.01)
*H02P 9/00*    (2006.01)

(52) U.S. Cl. .............................. 701/2; 701/21; 701/213; 700/286; 290/53; 290/54; 290/55; 405/76

(58) Field of Classification Search ............ 701/2, 701/213, 209
See application file for complete search history.

(56) References Cited

U.S. PATENT DOCUMENTS

| 7,098,846 | B2 | 8/2006 | Nielsen et al. | |
|---|---|---|---|---|
| 2004/0105411 | A1* | 6/2004 | Boatwright et al. | 370/338 |
| 2005/0005093 | A1* | 1/2005 | Bartels et al. | 713/150 |
| 2005/0228553 | A1* | 10/2005 | Tryon | 701/22 |
| 2006/0162642 | A1* | 7/2006 | Morse | 114/382 |
| 2009/0073034 | A1* | 3/2009 | Lin | 342/357.07 |

FOREIGN PATENT DOCUMENTS

WO    WO 2005/012079    *    2/2005

OTHER PUBLICATIONS

Martí, I., et al., "Evaluation of Advanced Wind Power Forecasting Models," Athens, Greece, http://anemos.cma.fr/download/publications/pub_2006_paper_EWEC06_WP2results.pdf.
Kariniotakis, G., et al., "Next Generation Short-Term Forecasting of Wind Power—Overview of the Anemos Project," http://anemos.cma.fr/.
Kariniotakis, G., et al., "The Anemos Wind Power Forecasting Platform Technology—Techniques and Experiences," http://anemos.cma.fr/.
Monaldo, F., et al., "Ocean Wind Field Mapping from Synthetic Aperture Radar and Its Application to Research and Applied Problems."

* cited by examiner

*Primary Examiner*—Thomas G Black
*Assistant Examiner*—Lin B Olsen

(57) ABSTRACT

A Supervisory Control And Data Acquisition (SCADA) system guides navigation of a vessel enabled to extract energy from wind and/or water currents primarily in offshore marine environments. An exemplary SCADA system could embody server and client software applications running on microprocessor systems at a remote control central service logging and energy distribution facility, and the vessel itself. The remote control service facility runs Human Machine Interface (HMI) software in the form of a Graphical User Interface (GUI) allowing choices to maximize system performance. The central server accesses information to control vessel position based on transmitted Global Position Satellite (GPS) data from the vessel, and weather information from the Geographic Information System (GIS) provided by multiple spatial temporal data sources. A server-side optimization algorithm fed the parameters delivered from vessel aerodynamic/hydrodynamic performance simulation software models, the vessel onboard sensor data, and integrated real-time weather and environmental data determines an optimal navigation through weather systems and presents choices to the HMI.

20 Claims, 2 Drawing Sheets

SUPERVISORY CONTROL AND DATA ACQUISITION SYSTEM FOR ENERGY EXTRACTING VESSEL NAVIGATION

BACKGROUND OF THE INVENTION

1. Field of the Invention

The present invention is generally in the field of supervisory control and data acquisition systems. More specifically, the present invention is embodied in a remote control system particularly for operation and navigation of a mobile structure that optimally recovers energy from an offshore marine environment.

2. Background Art

While many systems exist today for recovery of wind energy and water current or wave energy, most systems are stationary, mounted on or anchored to the sea floor. Many other hydrokinetic turbine energy systems exist today that affix to sailing vessels overcoming the limitations of fixed stationary structures. Nonetheless, all wind and hydrokinetic systems have the fundamental limitation of total possible recoverable energy at any given time being directly proportional to the cube of the velocity of the motive fluids. This inherent limitation renders most of these systems economically infeasible when considering the manufacturing and operational costs of the system and the typical ambient wind and water current vectors rarely summing to a magnitude greater than twenty knots. While sailing vessel designs exist such as catamarans, which reputedly can exceed true wind speed, the function of immersing a hydrokinetic turbine as an appendage of such a vessel immediately incurs drag upon the vessel ultimately to reduce the speed of the motive fluid through the turbine to unprofitable energy recovery rates. U.S. Pat. No. 7,298,056 for a Turbine-Integrated Hydrofoil addresses an implementation of a drag-reducing appendage as means to an economically viable solution. The specification of this reference application suggests remote controlled operation but does not expressly depict intentional unmanned operation of such a mobile structure for economic benefit into an environment of such high energy as to otherwise present conditions hazardous to human crews. The aforementioned reference patent application also does not delineate the various parts of the communication system in detail, thus does not enable in full, clear, concise, and exact terms, one skilled in the art to reduce such a remote control system to practice.

Therefore, there exists a need for a novel Supervisory Control And Data Acquisition system that remotely controls the operation and particularly the navigation of a mobile structure that can cost-effectively extract energy in an optimal manner from an environment that inherently presents untenable risk to human life.

SUMMARY OF THE INVENTION

The present invention is directed to a novel Supervisory Control And Data Acquisition (SCADA) remote control system for a mobile structure that recovers naturally occurring energy from severe weather patterns. The present specification embodies an offshore energy recovery system wherein an algorithm optimizes efficiency in the system by accounting for data from weather observations, and from sensors on the mobile structure, while relating these data points to performance models for the mobile structure itself. The present specification exemplifies the use of the algorithm in navigating a sailing vessel optimized to reduce drag while responding to wind and water velocity vectors by adjusting points of sail, rudder rotation, openness of turbine gates, and ballast draft, through control outputs from the microprocessor system on-board the sailing vessel. The SCADA system includes computer servers that gather data through diverse means such as Global Position Satellite (GPS) systems, weather satellite systems of the National Aeronautics and Space Administration (NASA), the National Oceanic and Atmospheric Administration (NOAA), and United States Air Force Defense Meteorological Satellite Program (DMSP) communicated through various geographic and weather data resources including but not limited to the Geographic Information System (GIS) of NOAA's National Weather Service (NWS) along with all other weather information sources available from its National Hurricane Center (NHC) and Tropical Prediction Center (TPC). The SCADA computer servers run Human Machine Interface (HMI) secure software applications which communicate to microprocessor systems running client software with a Graphical User Interface (GUI) to allow remote humans to optionally interact and choose mission critical navigation plans.

In addition, the present invention is not limited to implementation of the exemplary referenced Turbine-Integrated Hydrofoil system of U.S. Pat. No. 7,298,056. The present invention applies to remote control of any system that exploits energy from weather patterns that avail formidable amounts of naturally occurring energy. Any mobile structure that extracts energy from electrical storms, windstorms, offshore tropical storms or hurricanes, or any aerodynamic or hydrokinetic electromechanical mobile system for renewable energy recovery under remote control especially benefits from the present invention. Otherwise whereby without the present invention that enables a mobile system to automatically track environmental conditions hazardous to humans anywhere in the universe, such risks of danger renders manned operation undesirable and thus the cost benefits and ease of implementation of such energy exploitation systems unrealizable.

Finally, because the system embodied within the present invention comprises an algorithm that optimizes energy extraction using yield functions derived from weather and geospatial data and vessel performance models, the same system using just the path cost algorithm without weighing energy extraction yield factors into the cost of travel, may guide navigation of vessels for logistics-only purposes past such weather patterns.

DETAILED DESCRIPTION OF THE INVENTION

The present invention pertains to a remote control system and algorithm for supervisory control and data acquisition enabling navigation and automatic operation of a mobile energy recovery system. The following description contains specific information pertaining to various embodiments and implementations of the invention. One skilled in the art will recognize that one may practice the present invention in a manner different from that specifically depicted in the present specification. Furthermore, the present specification need not represent some of the specific details of the present invention in order to not obscure the invention. A person of ordinary skill in the art would have knowledge of such specific details not described in the present specification. Obviously, others may omit or only partially implement some features of the present invention and remain well within the scope and spirit of the present invention.

The following drawings and their accompanying detailed description apply as merely exemplary and not restrictive embodiments of the invention. To maintain brevity, the present specification has not exhaustively described all other embodiments of the invention that use the principles of the present invention and has not exhaustively illustrated all other embodiments in the present drawings.

Figure 1:
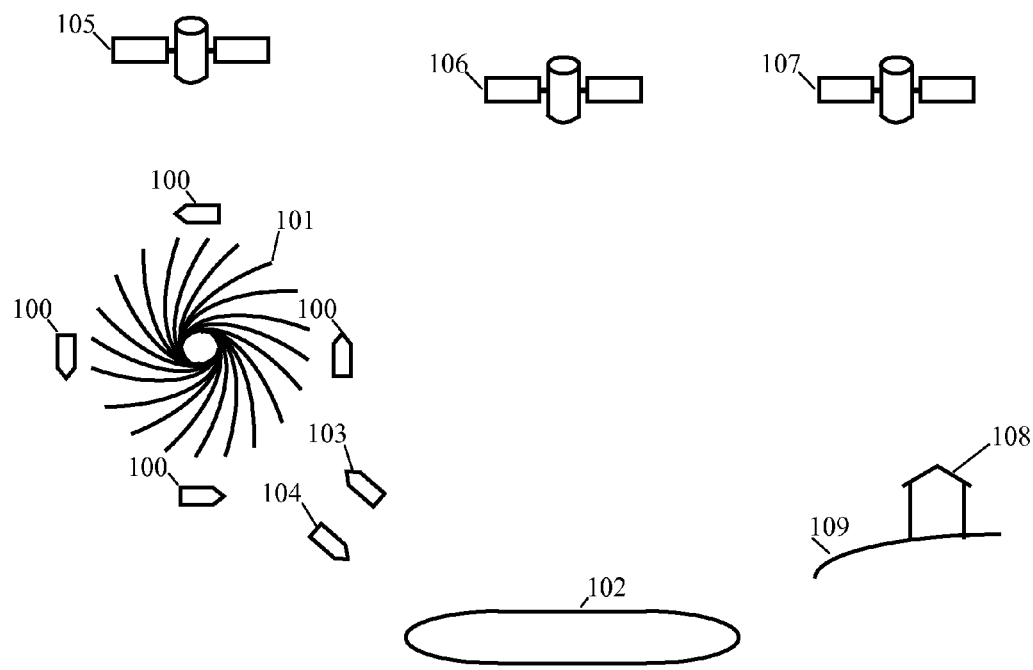
FIG. 1 illustrates a top-level view of all components in an exemplary system in accordance with one embodiment of the present invention.

FIG. 1 illustrates a top-level diagram of all components of an exemplary practical embodiment of the present invention. Block 100 represents an offshore mobile energy recovery structure in the process of energy extraction in an exemplary embodiment of the present invention. Exemplary embodiments of mobile structure 100 include sailing or propelled vessels or barges or any mobile buoyant energy recovery system known by one of ordinary skill in the art. A non-exhaustive list of mobile structures 100 for energy recovery includes: the Turbine-Integrated Hydrofoil of U.S. Pat. No. 7,298,056; any wave energy conversion system with propulsion means allowing relocation; one or plural wind turbines on floating platforms with propulsion means allowing relocation; or one or plural lightening rods on floating platforms with propulsion means allowing relocation for extracting energy from electrical storms; or any mobile system that extracts energy from pneumatic and/or hydrokinetic sources with aerodynamic and/or hydrodynamic drive means. The aforementioned list of mobile structures 100 represents purely exemplary embodiments by no means restrictive of mobile structure 100 embodiments within the scope and spirit of the present invention. FIG. 1 further depicts mobile structure 100 in the process of energy extraction circumnavigating what appears to be a vortical weather pattern 101. As one may infer from the counterclockwise vortex streamlines, the weather pattern 101 manifests in the northern hemisphere as implied by the Coriolis effect. Note that this representation of a weather pattern 101 is strictly exemplary and that a weather pattern 101 consistent with a description of a cyclone in the southern hemisphere; a typhoon in south east Asia; a williwaw non-vortical gap flow or barrier jet wind storm offshore from the Alaskan coast or similar weather pattern elsewhere; any tropical storm; or any hurricane, remains well within the scope of a weather pattern 101 for the purposes of the present invention. The exemplary embodiment further comprises a central service facility 102 for the purpose of service logging, maintenance, and bulk energy storage for later distribution, and especially where the remote control of the mobile structure 100 occurs. One may note that energy storage comprises compressed hydrogen, metal hydride storage, or charged batteries or capacitors, as long as the mobile structure 104 and the central service facility 102 employ energy storage systems with compatible upload interfaces. The graphical representation of the central service facility 102 in FIG. 1 evokes the notion of a large vessel such as a tanker ship, but a port facility equally qualifies as a central service facility 102 within the scope of the present invention. The depiction of mobile structure 103 en route to the weather pattern 101 and mobile structure 104 returning to the central service facility 102 emphasizes that complete round-trip operation of one or plural mobile structures 100, 103, 104, whether engaged in energy recovery as in mobile structure 100 or returning a payload as in mobile structure 104, essentially comprises tasks performed by the remote control system of the present invention.

Essential to the operation of the complete SCADA system is the communication of data from various sources. FIG. 1 further illustrates three types of satellites, Global Position Satellites (GPS) 106, weather satellites 105, and telecommunications satellites 107, comprising the SCADA remote control system in this exemplary embodiment. In practically all embodiments, the SCADA system tracks the position and velocity of the mobile structure 100 through a GPS 106 system. The central service facility 102, if itself indeed mobile, likely also tracks its own location using a GPS 106 system. This specification will further expound upon the use of the GPS 106 system as a SCADA control algorithm input in subsequent paragraphs describing FIG. 4. This specification will hereinafter use the generic term weather satellite 105 when referring to any of the weather tracking satellites availing weather data to various government and private entities. A non-exhaustive list of weather satellites 105 able to serve this function includes: the NASA QuikSCAT; the NOAA Synthetic Aperture Radar (SAR) satellites including Radarsat-1, and Envisat satellites; any of the satellites serving the NOAA Satellite Services Division (SSD) National Environmental Satellite Data and Information Service (NESDIS) including Meteosat-7, Eumetsat, MTSAT-1R, Global Earth Observation Systems, GOES-EAST (GOES-12), GOES-WEST (GOES-11), GOES-9, GOES-10, GOES-13, or POES satellites. The aforementioned list of weather satellites 105 represents purely exemplary embodiments by no means restrictive of weather satellites 105 embodiments within the scope and spirit of the present invention. Telecommunications satellites 107 represent how data communicates between the central service facility 102 and one or plural of many possible entities including those accessible through the Internet from where all weather data in this exemplary embodiment disseminates, such as from the National Weather Service 108 Geographic Information System (GIS) computer servers. Besides weather satellite 105 data, the NWS 108 GIS and many other such entities including those accessible through the Internet disseminate weather data from other sources such as: oceanic weather buoys; coastal meteorology stations, Coastal Marine Automated Network Stations (C-MAN); NOAA Aircraft Operations Center; NOAA National Hurricane Center (NHC) Aircraft Reconnaissance "Hurricane Hunters"; United States Air Force 53$^{rd}$ Weather Reconnaissance Squadron; USAF GPS Dropwindsondes; and RIDGE radar. The aforementioned non-exhaustive list of alternate sources of weather information disseminated from the NWS 108 or similar weather data disseminating entities including those accessible through the Internet represents exemplary but not restrictive sources of weather data alternate to weather satellite 105 sources. The physical location of dissemination of data such as within an NWS 108 GIS computer server or similar weather data disseminating entities including those accessible through the Internet appears terrestrial-based; in other words, the hardware resides on land 109. Obviously, if the central service facility 102 existed at a port on shore, a more cost-effective and potentially higher bandwidth data communications link such as fiber optic cable thus supplants the telecommunications satellites 107 in communication with the NWS 108 GIS or other similar weather data disseminating computer servers. Telecommunications satellites 107 perform another function in an exemplary system such as communicating between the central service facility 102 and the mobile structure 100. However, the preferred embodiment employs a more cost-effective wireless communications system communicating between the mobile structure 100 and the central service facility 102 upon which this present specification will subsequently expound.

Figure 2:
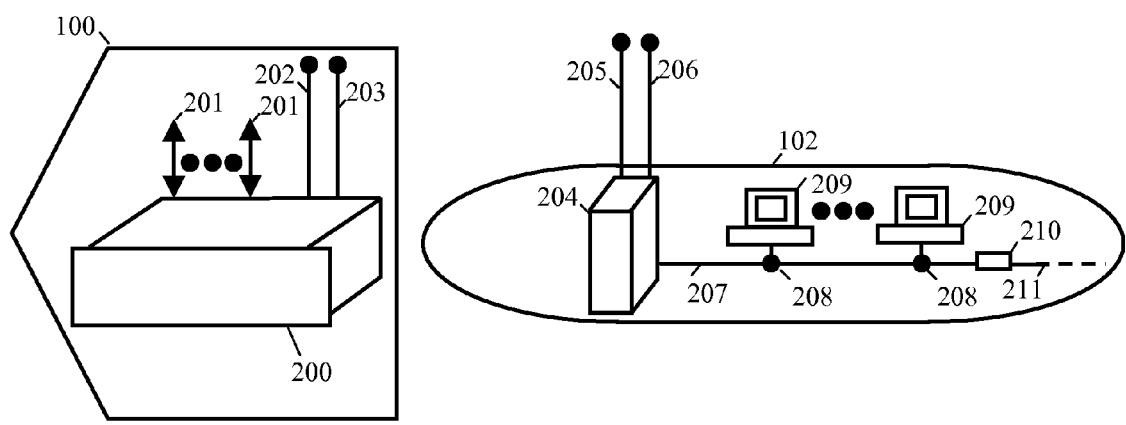
FIG. 2 illustrates a block diagram of the control, communications, and computer systems running server and client software applications in an exemplary system.

FIG. 2 illustrates an exemplary system wherein the mobile structure 100 further comprises a control and communications microprocessor system 200 along with the central service facility 102 further comprising a microprocessor system running secure server 204 software applications and workstations 209 running secure client software applications communicating with the server 204 via a Local Area Network (LAN) 207. In some embodiments, all the secure server and client software applications running within the central service facility 102 may execute on a single large computing system, but given today's state of the art computing technology, a multi-processor server-client LAN 207 topology offers the greatest advantage in terms of flexible architecture, cost-effective computing power, reliability, scalability, and durability. In some embodiments, the control and communications microprocessor system 200 located within the mobile structure 100 comprises a type of microprocessor computing system 200 known as a Programmable Logic Controller (PLC). Traditionally evolving from industrial process control applications, a PLC 200 comprises ruggedized hardware robust to physical environments demanding resistance to mechanical shock and vibration, temperature extremes, and specifically, customization for control and communication purposes fitting SCADA system applications. Regardless of whether the microprocessor system 200 comprises custom hardware or an off-the-shelf product from a renowned PLC vendor, the microprocessor system 200 needs to execute certain functions as depicted in FIG. 2 in practically all embodiments. The microprocessor system 200 will require input, output, and input/output (I/O) functions 201 for communicating with sensors and control circuits. A wide variety of sensor and control circuits communicating with the microprocessor system 200 through I/O 201 necessary for inputting and outputting variables to the preferred SCADA control algorithm exist within most practical embodiments of the mobile structure 100. A non-exhaustive list of sensor and control circuits 201 includes: accelerometers and gyroscopes for analysis of vessel 100 stability also known as attitude, or heeling and listing, along with heading, or to borrow aviation terms, pitch, roll and yaw, respectively, and rendering virtual contours of immediate local oceanic surface and possibly advanced features such as dead reckoning; ballast draft readings and adjustments; a wind vane and anemometer or if combined into a single unit an aerovane for analysis of apparent wind vectors' direction and magnitude respectively; fuel gauges for both propulsion motor fuel reserves and output fuel from energy recovery functions and thus mobile structure 100 weight and energy efficiency; electrolyzer electrode temperature gauges; energy extracting electric generator armature voltage readings and field current adjustments; energy extracting turbine gate opening readings and adjustments affecting mobile structure 100 drag; a compass for mobile structure 100 direction; a GPS receiver 202 for tracking position, velocity, and using way points to compare wind sensor data comprising local apparent wind vectors, minus mobile structure 100 velocity to determine local true wind vector, then comparing that empirical data to data from weather satellites 105 and other sources measuring and/or estimating true wind velocity; rudder rotation readings and adjustments; propeller rotational speed readings and adjustments; sail trim and/or boom rotation readings and adjustments; radar and/or sonar systems for physical object detection, identification, and avoidance; and one or plural video camera data streams allowing actual views of the surrounding environment of the mobile structure 100, and physical object visual pattern matching. The aforementioned list of microprocessor I/O functions 201 represents purely exemplary embodiments by no means restrictive of I/O function 201 embodiments within the scope and spirit of the present invention. In terms of SCADA software data structure development, any or all of the aforementioned I/O functions 201 constitute one or plural SCADA object tag definitions, for various software layers to communicate from the mobile structure 100 microprocessor system 200; to the central service facility 102 servers 204; to the central service facility 102 workstations 209. Weather satellite 105 data or alternate sources of weather information disseminated from the NWS 108 or similar weather data disseminating entities including those accessible through the Internet will also constitute SCADA object tag definitions. This specification will further expound upon the use of the SCADA object tags within the preferred SCADA control algorithm in subsequent paragraphs describing FIG. 4.

The remaining functions associated with the microprocessor system 200 in FIG. 2 include the antenna 202 representing the receiver for the GPS system. The other antenna 203 represents the means by which the microprocessor system 200 of the mobile structure 100 receives and transmits over a wireless physical medium to the central service facility 102 server 204. As previously mentioned, one system of communication 203 embodies satellite 107 telecommunications. In the preferred embodiments, as long as the mobile structure 100 remains within line-of-sight with the central service facility 102, as one presumes on the open sea, a point-to-point Code Division Multiple Access (CDMA) system permitting high bandwidth data including video camera data streams provides the communications function in the preferred embodiment. Another wireless physical medium in the form of point-to-point Ultra High Frequency (UHF) radio exists. While of lower bandwidth, UHF offers wider range and does not require line-of-sight as does CDMA, and thus an embodiment of the present invention may incorporate UHF as a redundant back-up in case of loss-of-signal for the CDMA. For SCADA systems without video data streams, UHF may actually serve the primary communication channel function. These wireless telecommunications systems represent exemplary embodiments without restriction to other possible wireless telecommunications systems embodied within the scope and spirit of the present invention.

The central service facility 102 houses the server 204 for the primary purpose of aggregating weather data from any one or plural weather data disseminating entities including those accessible through the internet such as the NWS 108. Some embodiments achieve robust data reliability through implementing redundant or multiple servers 204. The telecommunications system represented in FIG. 2 includes the link 205 to the mobile structure 100 and the link 206 to the NWS 108 or similar weather data disseminating entities including the Internet itself. On the central service facility 102, link 205 and link 206 complete the channel with the mobile structure 100 and weather data disseminating entities including those accessible through the internet such as the NWS 108, respectively, using physical mediums and protocols as previously discussed. The LAN 207 in exemplary embodiments conforms to such network standards as IEEE 802.3, 802.3u, 802.11a,b, or g or any standard suiting the needs of the server-client software applications in the present invention, and the Network Interface Cards (NIC's) 208, hardware generally integrated into the workstations 209, likewise conform to the aforementioned exemplary network standards. All embodiments very likely operate under the most common protocol implemented today, Transmission Control Protocol/Internet Protocol (TCP/IP) for passing of packets of data associated with SCADA object tags between the server 204, the workstations 209, and the PLC 200. In an embodiment wherein the central service facility 102 resides on land 109, the LAN 207 accesses a Wide Area Network (WAN) 211 for weather satellite 105 data or alternate sources of weather information disseminated from the NWS 108 or similar weather data disseminating entities including those accessible through the Internet through a router 210 instead of through a telecommunications satellite 107 as in an offshore central service facility 102. Either the server 204 or the router 210 may execute firewall security software during network communications. Other forms of secure communication between the server 204, the workstations 209, and the PLC 200 may include Internet Protocol Security (IPSec) with packet encryption and decryption occurring during transmission and reception within TCP/IP for all the aforementioned computer systems. These network standards and protocols examples represent several of many possible network standards and protocols configurations within the scope of the present invention and one must view these network standards and protocols configurations as exemplary, not restrictive.

Figure 3:
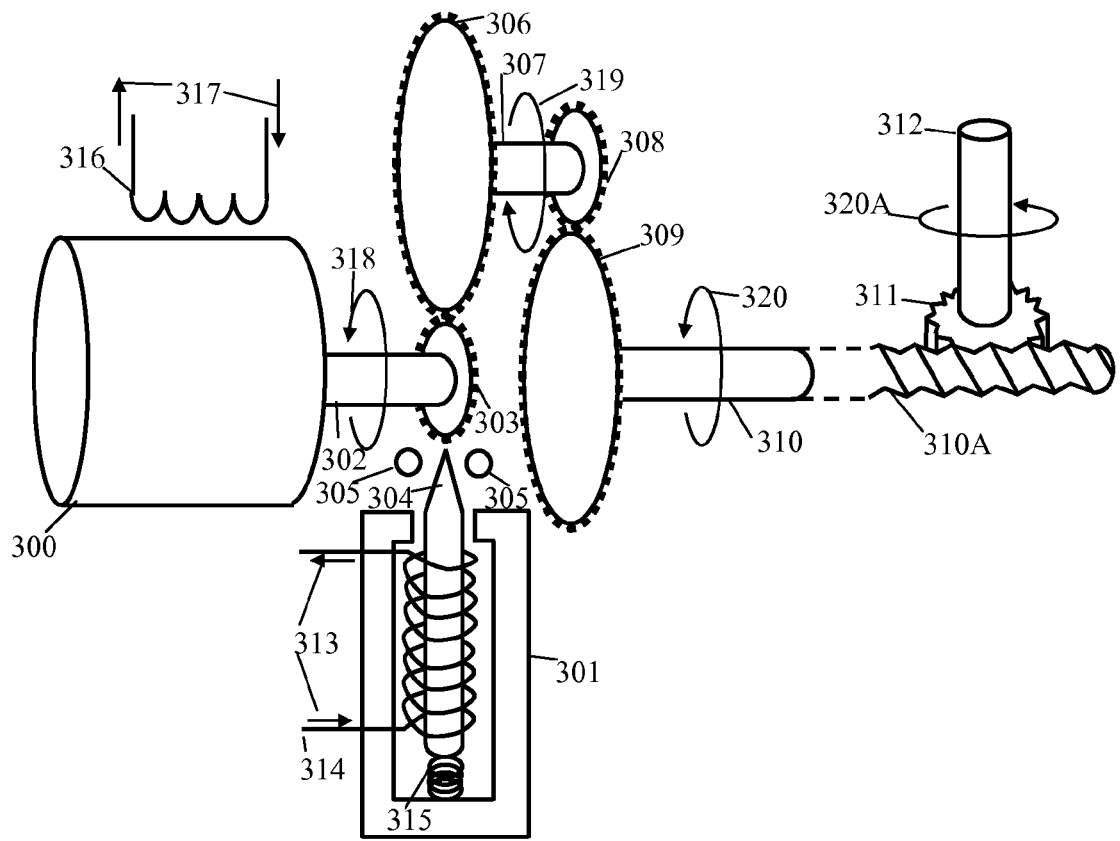
FIG. 3 illustrates electromechanical circuits for actuating control of various mechanisms affecting position and velocity of the mobile structure in an exemplary system.

FIG. 3 illustrates the control-actuating electromechanical circuits in an embodiment of the mobile structure 100. Exemplary controls on the mobile structure 100, 103, 104 include rudder rotation, propeller rotation in propelled embodiments, and sail trim or boom rotation in sailing embodiments. Actuation of all mechanical members begins with motor 300 activation by driving a current 317 through the motor's 300 winding 316. As shown in FIG. 3, the rotor 302 of the motor 300 affixed to a small gear 303 couples to a larger gear 306 affixed to an intermediate gear shaft 307 affixed to another small gear 308 coupled to another larger gear 309 affixed to the final drive shaft 310 in a direct drive system or to a worm 310A in a worm drive system. A system comprising such gear ratios as depicted in FIG. 3 serves the purpose of reducing torque on the motor 300 that generally exhibits a high rotational velocity, low torque characteristic in lightweight, economical motor 300 embodiments. For actuating a propeller, the preferred embodiment obviously installs a motor 300 capable of greater torque and variable speed. In the worm drive embodiment, the worm 310A and worm gear 311 interface further reduces the torque on the rotor 302 compared to that on the final drive shaft 312. An embodiment comprising a worm drive also affords the advantage of the braking effect such that the direction of transmission always goes from the rotor 302 to the shaft 312 and not vice versa given an appropriate coefficient of friction between the worm 310A and the worm gear 311. Other embodiments rely upon the detent torque of a stepper motor 300 for braking. In other embodiments, such as servo motors 300 or variable reluctance motors 300 may not afford adequate detent torque and thus a solenoid 301 inserts a spring-activated 315 plunger tip 304 between the teeth of the first small gear 303 to lock-in detent and sustain torque against stops 305 when the solenoid 301 coil 314 has no current 313 flowing. Such an embodiment proceeds in actuating a control mechanism first by driving current 313 in the direction shown per the right hand rule causing the solenoid 301 coil 314 to unlock the gear 303, then driving current 317 in the motor winding 316, to initiate rotation 318 translated through rotation 319 to rotation 320 or 320A to rotate a rudder or rotate a sail boom. Once actuation completes, the solenoid 301 coil 314 no longer conducts current, returning the solenoid 301 plunger tip 304 to the locked position. All such control algorithm steps thus have their own unique SCADA object tag definitions. As PLC's 200 have traditionally evolved from industrial process applications including SCADA systems control software, portability of Computer Numeric Controlled (CNC) G-code for servo-motors 300, and servo mechanisms such as mechanical lead screw, or ball screw systems analogous to worm drive systems enable preferred embodiments of control actuators in the present invention. One must note that partial implementations or minor deviations known by one of ordinary skill in the art of any of the exemplary embodiments of the aforementioned control actuator electromechanical circuits do not represent a departure from the scope or spirit of the present invention.

Figure 4:
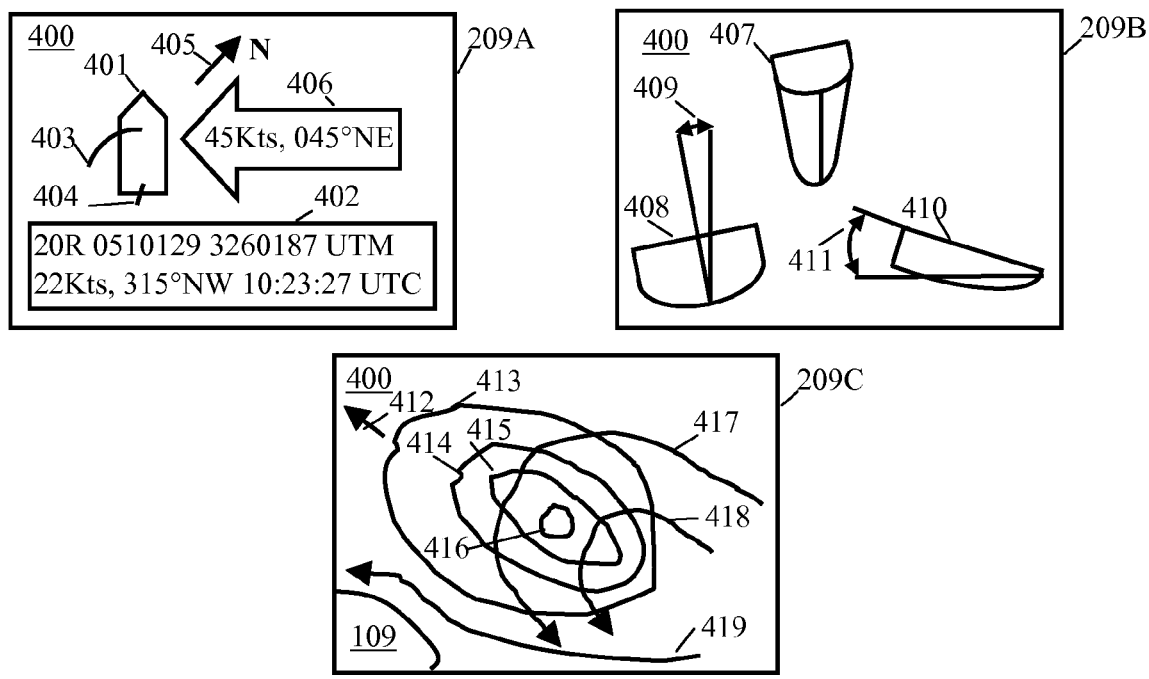
FIG. 4 illustrates a representation of the graphical user interface on a client computer system in one embodiment of the present invention.

FIG. 4 illustrates the visual representations that appear on the Graphical User Interface (GUI) 400 of one or plural client workstations 209 at the central service facility 102, and illustrates how a human can affect the behavior of exemplary SCADA algorithms. The foregoing exemplary SCADA algorithms run on one or plural server 204 processing systems including a GIS that performs all the data collection, processing, storage, analyses and navigation vector determinations accessible through the GUI 400 on one or plural client workstations 209. Three different workstations 209A, B, or C displaying information pertaining to one or plural mobile structures 100, or one workstation displaying three different GUI's 400 at different times, at one time displaying the GUI 400 of workstation 209A, at another time the GUI 400 of workstation 209B, and at another time the GUI 400 of workstation 209C operate at the central service facility 102. Using typical computer pointing and data entry hardware, a human operating the workstation 209 may interact with the GUI 400 to invoke any of the GUI's 400 on any of the workstations 209A, B, or C as shown in FIG. 4. The GUI 400 of workstation 209A displays position, heading, velocity, and points of sail for the mobile structure 100 in the process of energy extraction in a sailing vessel embodiment. Vessel icon 401 graphically shows direction of the mobile structure 100 relative to true north given by the compass icon 405. GPS field 402 numerically provides vessel instantaneous location, velocity, and heading. Sail icon 403 and rudder icon 404 along with surface true wind data 406 begotten from various aforementioned weather data sources 108, or empirically derived from GPS 202 and aerovane sensor 201 data as previously described permits observation and control of the points of sail of the mobile structure 100 in a sailing vessel embodiment. Obviously, in a propelled embodiment, a propeller icon serves analogous functions as the sail icon 403.

Pointing and data entry hardware on the workstation 209A allows a human operator to point and select the aforementioned icons and data fields to alter visual representations and alter instantaneous control of the mobile structure 100. For instance, if a human operator points and selects vessel icon 401, sail icon 403, or rudder icon 404, the operator may view a alphanumerical field indicating points of sail using nautical terms such as "Beam Reach" to describe that point of sail shown on the display of workstation 209A. At this point, the GUI 400 can numerically give displacement angles of the boom and the rudder with an option to the human operator to manually change these values, override auto-navigation, and actuate rotation of the boom or rudder on the mobile structure 100 as previously described. Herein the GUI 400, the preferred SCADA algorithm invokes performance models for the mobile structure 100 to estimate or forecast energy efficiency thereof, using a Velocity Prediction Program (VPP) performing Computational Fluid Dynamics (CFD) calculations on the sailing vessel along with its energy extracting appendage. The GUI 400 at this point also suggests for instance, a "Broad Reach" point of sail given prevailing wind and optimal least-cost or highest yield path analysis inputs. Selecting the vessel icon 401 also permits the human operator to monitor, adjust, and receive performance predictions based on turbine gate openness and fuel tank fullness affecting the overall drag on the mobile structure 100, given the VPP performing CFD calculations on the modeled energy extracting turbine appendage. Note for a preferred SCADA algorithm of the present invention, the sailing vessel VPP will output data tabulating generated power, instead of velocity for typical prior art VPP's, for the given true wind speed, turbine gate openness, fuel tank fullness, and heading, along with the accompanying points of sail and control settings. Obviously, an exemplary SCADA algorithm performs an analogous propeller performance VPP and least-cost path analysis for a propelled mobile structure 103,104 during these GUI 400 operations. Selecting the GPS field 402 allows the human operator to change viewing options such as converting units of parameters such as position, changing the Universal Transverse Mercator (UTM) kilometer units to miles or to degrees, minutes, seconds of longitude and latitude; velocity, knots to kilometers per hour or miles per hour; or time, from Coordinated Universal Time (UTC) to local time. Selecting the GPS field 402 for a propelled embodiment of mobile structure 103, 104 allows for manually changing propeller rotational speed. Selecting the compass icon 405 or the true wind data 406 allows the viewing orientation angle of the vessel icon 401 to move relative to the compass icon 405 or true wind data 406, respectively.

The GUI 400 of workstation 209B in FIG. 4 illustrates a virtual reality representation 407, along with the attitude of the vessel, listing and heel angle, or to borrow aviation terms, roll and pitch, respectively, for the mobile structure 100 in the process of energy extraction. The virtual reality rendering 407 indicates a downward or plunging heel angle or pitch, and a port listing or roll. Had the vessel assumed an upward or breaching heel angle, the rendering 407 would display the deck instead of the hull as indicated in the rendering 407. If the mobile structure 100 sensors include a video camera data stream, actual oceanic surface in the vicinity the vessel will display in this GUI 400 frame. The view parallel 408 to the direction of travel further displays the port listing coordinated with the rendering 407, along with the angle of listing 409. A starboard listing or roll would result in an angle 409 in the opposite direction. The view perpendicular 410 to the direction of travel further displays the plunging or downward heel or pitch, coordinated with the rendering 407 and displaying the heel angle 411. Likewise, a breaching or upward pitch would result in the heel angle 411 displayed in opposite direction. Selecting the virtual reality 407 icon allows for changing the camera angle. Selecting the listing angle 409 icon or the heel angle 411 icon allows the human operator to manually set the threshold for a broach warning and associated control.

The GUI 400 of workstation 209C in FIG. 4 illustrates a weather map with path analysis lines 417, 418, 419 for the mobile structure 100 operating in the weather pattern 101. Browsing the GUI 400 of workstation 209C initiates a least-cost and highest yield path analysis whereby a weather semivariogram accounting for spatial structure including land mass 109 or seamounts 109, global trends and anisotropy, air temperature, water temperature, wind direction, wind speed, and wave data forms a basis for mapping predictive costs, or yields in the case of energy extraction. From the predictive map, the preferred SCADA algorithm assigns weights that average over suggested routes 417, 418, 419 based on path length in a weighted cost or yield raster. In the GUI 400 of workstation 209C, each concentric closed surface 413, 414, 415 represents areas of increasing wind and surge current energy inward to the eye 416 for a given weather pattern 101. While a global trend may indicate a greater degree of symmetry and counterclockwise, in this example northern hemispheric, vortex trend as in the FIG. 1 representation of the weather pattern 101, anisotropy caused by land 109 mass or seamount 109 and other stochastic modeled factors such as air temperature, water temperature, wind direction, wind speed, and wave data result in a probabilistic field that the semivariogram 413, 414, 415 represents. From this probability field, weather prediction analysis can predict a path 412 for the storm that further affects the least-cost or highest yield analysis. Note that in the GUI 400 of workstation 209C, the concentric closed surfaces 413, 414, 415 can selectively represent semivariogram values or else predictive energy regions, also known as a cost raster for non-energy extracting vessel logistics or a yield raster when referring to energy extraction. The preferred embodiment also includes an advanced physical object 109 detection, identification and avoidance system that remotely utilizes the integrated sensors including but not limited to on-board radar and sonar systems to perform sweeping remotely sensed anomalies returns. A preferred SCADA algorithm then compares the signatures of these electromagnetic energy returns against known libraries of predefined physical objects 109 based on size, shape, rate of movement and other characteristics to identify possible type of physical object 109 feature detected. Optionally, an exemplary algorithm further correlates the signatures against a video camera data stream for further classification and confirmation of the physical object 109. A preferred SCADA algorithm then invariably correlates the identified physical object 109 spatially against the vessel's 100, 102, 103, 104 current location, path and velocity in order to assess the need for altering the vessel's 100, 102, 103, 104 course to initiate avoidance and altered path routing and associated cost accounting. A preferred SCADA algorithm then indexes the identified physical object 109 in the algorithmic path controls to include avoidance or least cost path towards the physical object 109 depending on predetermined logic and/or human operator interaction. A preferred SCADA algorithm of the present invention thereby further accounts for VPP modeling of the mobile structure 100 when assigning weights that average over a path 417, 418, 419 based on direction and length in a weighted anisotropic energy yield raster. Depending on the cost or yield goal, the highest yield algorithm may select a path 417 or 418, yielding the highest energy in the shortest time with least risk to structural harm to the mobile structure 100, while the least-cost algorithm yields the shortest logistical trajectory with least risk to structural harm to an offshore embodiment of the central service facility 102, a non-energy extracting vessel. Selecting the path lines 417, 418, 419 allows the human operator to optionally choose mission critical navigation parameters such as cost and yield weights and cost or yield goals.

For all the aforementioned GUI 400 icons and data fields, a SCADA object tag definition exists for accessing the aforementioned data structures and evoking the aforementioned control. Object tags allow for structured programming techniques facilitating manageability and sustainability of a substantially large code base traversing multiple software application layer interfaces from the workstations 209, to the server 204 and from the server 204 to the PLC's 200, and from the server 204 to the one or plural of many possible entities including those accessible through the Internet from where all weather data in this exemplary embodiment disseminates, such as from the National Weather Service 108. Functional differences within the GUI 400 for workstations 209A,B, or C clearly do not present a substantial departure from the scope and spirit of the present invention.

From the preceding description of the present invention, this specification manifests various techniques for use in implementing the concepts of the present invention without departing from its scope. Furthermore, while this specification describes the present invention with specific reference to certain embodiments, a person of ordinary skill in the art would recognize that one could make changes in form and detail without departing from the scope and the spirit of the invention. This specification presented embodiments in all respects as illustrative and not restrictive. All parties must understand that this specification does not limited the present invention to the previously described particular embodiments, but asserts the present invention's capability of many rearrangements, modifications, omissions, and substitutions without departing from its scope.

Thus, a supervisory control and data acquisition system for energy extracting vessel navigation has been described.

What is claimed is:

1. A supervisory control and data acquisition system for an offshore energy recovery system comprising:
    one or plural mobile structures able to extract energy from wind or water currents, or electrical storm activity;
    a remote control central service facility;
    microprocessor systems running server and client software systems;
    wherein said mobile structure further comprises sensors to track position of, velocity of, and amount of energy recovered by said mobile structure;
    wherein said remote control central service facility further comprises access to primary geographic information system data and predictive performance models for velocity to predict energy recovery of said mobile structure;
    wherein said remote control central service facility further comprises control of mechanisms that govern navigation of said mobile structure;
    wherein said control of mechanisms that govern navigation of said mobile structure is performed by a programmable logic controller adapted for supervisory control and data acquisition systems.

2. The supervisory control and data acquisition system of claim 1 wherein said remote control central service facility further comprises a microprocessor running server software which accesses transmitted Global Position Satellite data from said mobile structure, and weather and environmental data from secondary geographic information systems from one or plural sources to govern said navigation of said mobile structure.

3. The supervisory control and data acquisition system of claim 2 wherein said server software further comprises an algorithm to optimize said energy recovery based on said predictive performance models for velocity to predict energy recovery, said sensors of said mobile structure, and said weather information.

4. The supervisory control and data acquisition system of claim 3 wherein said remote control central service facility further comprises microprocessor systems running human machine interface server software communicating to client software displaying a graphical user interface.

5. The supervisory control and data acquisition system of claim 4 wherein said graphical user interface displays options to humans deciding optimal mission critical navigation of said mobile structure.

6. The supervisory control and data acquisition system of claim 5 wherein said client software accesses said server human machine interface software to display data from said optimization algorithm upon said graphical user interface.

7. The supervisory control and data acquisition system of claim 6 wherein said accesses of data performed by said client or server software is communicated through Transmission Control Protocol and Internet Protocol.

8. The supervisory control and data acquisition system of claim 1 wherein said control of mechanisms that govern navigation of said mobile structure further comprise one or plural motors that rotate a rudder of said mobile structure.

9. The supervisory control and data acquisition system of claim 1 wherein said control of mechanisms that govern navigation of said mobile structure further comprise one or plural motors coupled to propellers which drive said mobile structure.

10. The supervisory control and data acquisition system of claim 1 wherein said control of mechanisms that govern navigation of said mobile structure further comprise one or plural motors that rotate a boom about a mast of a sailing vessel embodying said mobile structure.

11. The supervisory control and data acquisition system of claim 2 wherein said server access to data from said mobile structure sensors occurs over one or plural wireless radio frequency signal channels.

12. The supervisory control and data acquisition system of claim 11 wherein said wireless radio frequency signal channel is point-to-point Ultra High Frequency Radio.

13. The supervisory control and data acquisition system of claim 11 wherein said wireless radio frequency signal channel is Code Division Multiple Access Radio.

14. The supervisory control and data acquisition system of claim 11 wherein said wireless radio frequency signal channel is satellite communications.

15. The supervisory control and data acquisition system of claim 2 wherein said server software further comprises an algorithm to analyze yield of energy for said mobile structure on a predicted path based on said weather and environmental data and said predictive performance models for velocity to predict energy recovery of said mobile structure.

16. The supervisory control and data acquisition system of claim 15 wherein said mobile structure sensors further comprise radar or sonar;
    wherein said algorithm accesses data from said radar or sonar for physical object detection, identification, and avoidance;
    wherein said algorithm analyzes yield of energy for a path for said avoidance.

17. The supervisory control and data acquisition system of claim 16 wherein said mobile structure sensors further comprise one or plural video camera data streams;
    wherein said algorithm accesses said video camera data streams to further classify or confirm said physical object detection, identification, and avoidance.

18. The supervisory control and data acquisition system of claim 4 wherein said client accesses said server through a secure remote client control connection software application.

19. The supervisory control and data acquisition system of claim 5 wherein said graphical user interface further comprises virtual reality representations of various view angles.

20. The supervisory control and data acquisition system of claim 19 wherein said mobile structure sensors further comprise one or plural video camera data streams to enhance said virtual reality representations of various view angles.

* * * * *

UNITED STATES PATENT AND TRADEMARK OFFICE
CERTIFICATE OF CORRECTION

| | | |
|---|---|---|
| PATENT NO. | : 7,698,024 B2 | Page 1 of 1 |
| APPLICATION NO. | : 11/942576 | |
| DATED | : April 13, 2010 | |
| INVENTOR(S) | : Andrew R. Gizara et al. | |

It is certified that error appears in the above-identified patent and that said Letters Patent is hereby corrected as shown below:

* Column 11, Line 25, in Claim 1, before "storm" please delete "electrical".

Signed and Sealed this
First Day of May, 2012

David J. Kappos
*Director of the United States Patent and Trademark Office*